United States Patent [19]

O'Steen

[11] 4,003,458
[45] Jan. 18, 1977

[54] FAIL SAFE CENTRIFUGAL CLUTCH
[75] Inventor: James K. O'Steen, Olney, Md.
[73] Assignee: The United States of America as represented by the Secretary of the Navy, Washington, D.C.
[22] Filed: July 31, 1975
[21] Appl. No.: 600,660
[52] U.S. Cl. .................. 192/105 BB; 192/105 CF; 192/103 B; 192/71
[51] Int. Cl.² ........................................ F16D 43/14
[58] Field of Search ............. 192/105 BA, 105 BB, 192/105 CF, 103 B, 104 C, 71; 188/186

[56] References Cited
UNITED STATES PATENTS

| | | | |
|---|---|---|---|
| 2,219,883 | 10/1940 | Amtsberg | 192/103 B X |
| 2,267,334 | 12/1941 | Keller | 192/105 BB X |
| 2,635,476 | 4/1953 | Bucy et al. | 192/105 BB X |

FOREIGN PATENTS OR APPLICATIONS

| | | | |
|---|---|---|---|
| 849,356 | 8/1939 | France | 192/105 BB |

Primary Examiner—Benjamin W. Wyche
Attorney, Agent, or Firm—R. S. Sciascia; A. L. Branning; F. K. Yee

[57] ABSTRACT

A fail-safe, velocity-discriminating centrifugal clutch having a biased, motion-transmitting pawl element displaceable at speeds at or above a predetermined threshold value to an engagement position with a driven ratchet assembly. Under conditions of missing or malassembled parts, clutch operation is in the failsafe mode with no transmission of rotary motion. In the engaged position, no centrifugal force generated by the pawl element is applied to the ratchet assembly. This feature, plus the radial contact between the pawl element and the ratchet assembly, allows operation between misaligned input and output shafts, even at high rotational speeds.

8 Claims, 14 Drawing Figures

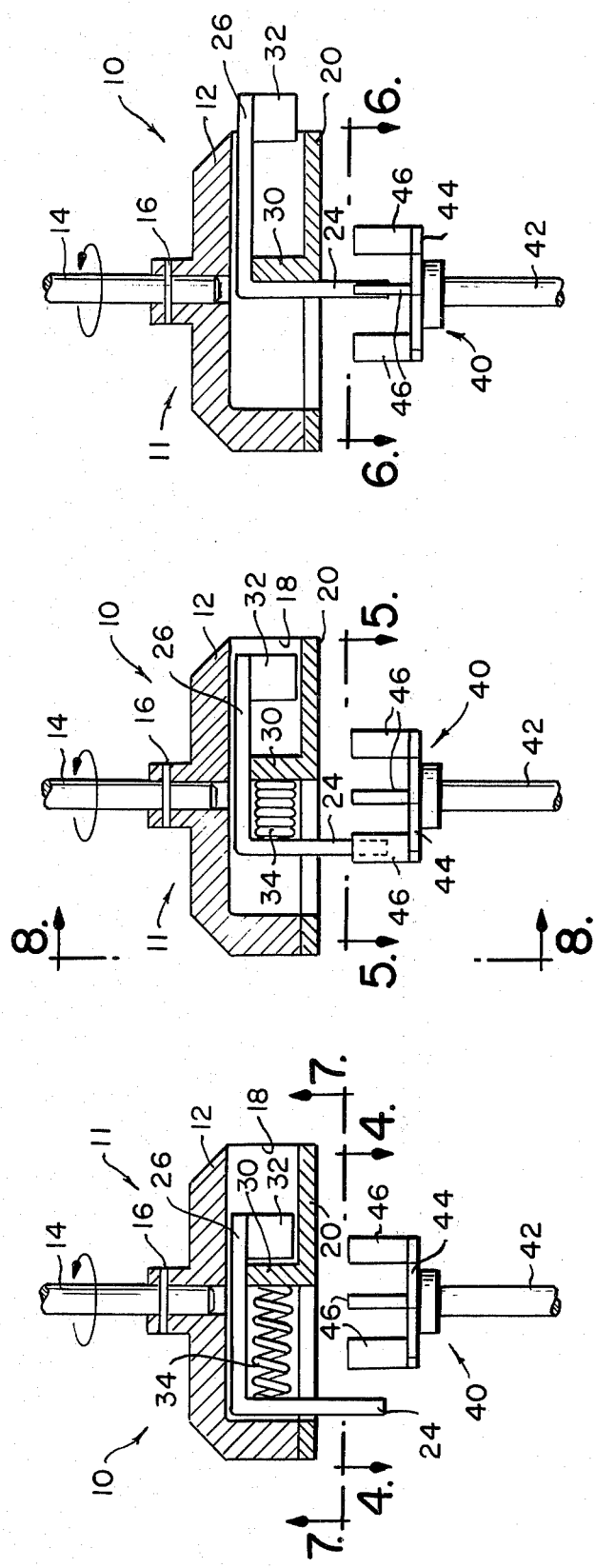

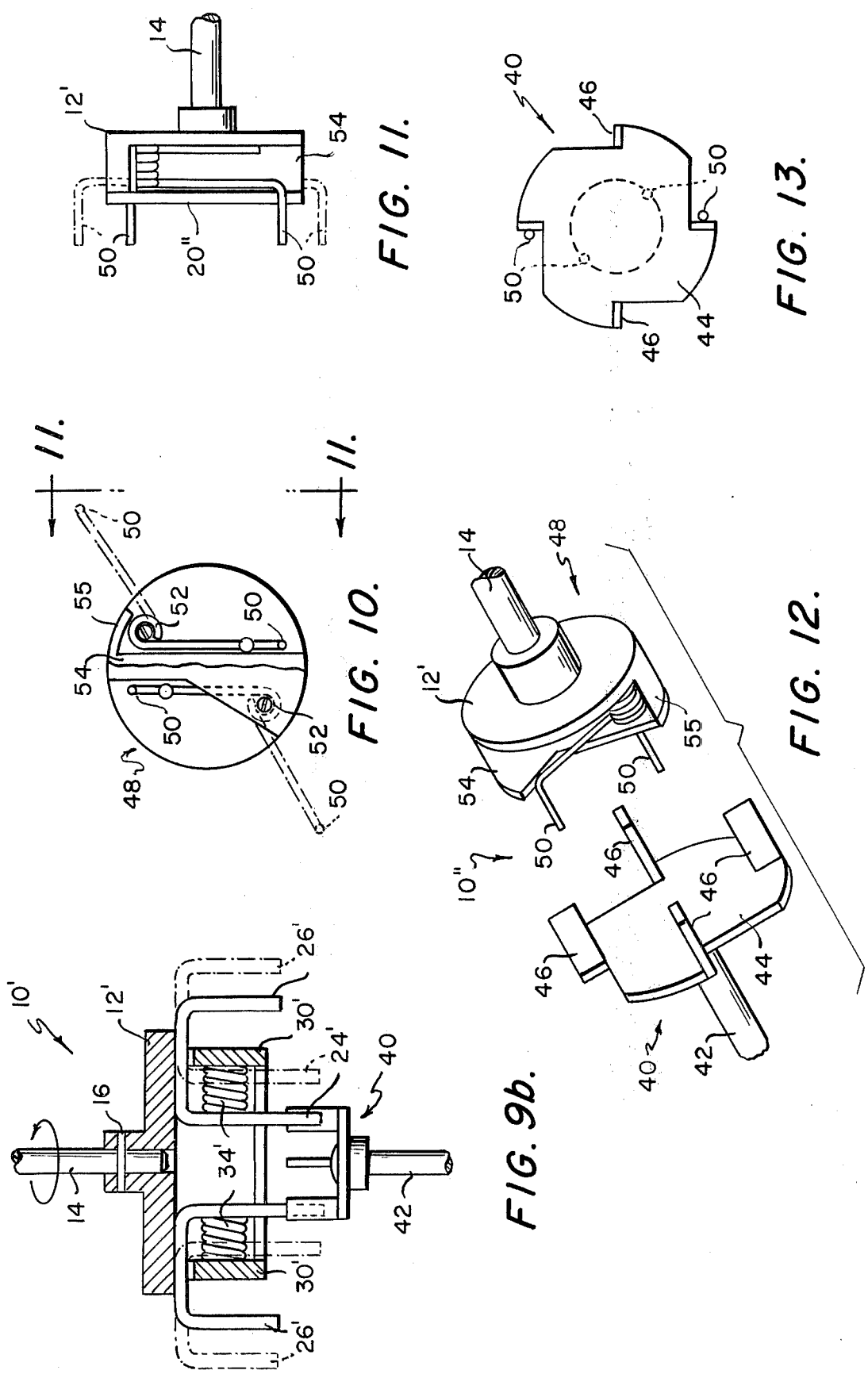

FAIL SAFE CENTRIFUGAL CLUTCH

BACKGROUND OF THE INVENTION

The present invention relates generally to centrifugal clutches and more particularly to a new and improved centrifugal clutch and flexible coupling which is fail safe and capable of transmitting motion between misaligned input and output shafts.

Centrifugal clutches coupled to turbine wheels or propeller blades are used in air-dropped ordnance to provide air velocity discrimination for weapon safety. This velocity discrimination is provided by calibrating turbine or propeller rotational velocity to the driving air velocity. In turn, the centrifugal clutch is designed to engage at a rotational velocity corresponding to the chosen threshold air velocity. The rotational motion transmitted by the engaged clutch is used for various safing-and-arming or fuzing functions to provide safety during shipment, storage, and handling of the ordnance.

Presently existing centrifugal clutches have disadvantages, particularly for ordnance applications. The clutches fail in an unsafe mode if components are omitted or malassembled. This does not satisfy the safety requirements of high explosive weapons. Additionally, if the input and output shafts are misaligned, the clutch weights generate high centrifugal, radial bearing loads at high rotational velocities, resulting in shaft bearing failures.

The disadvantages of existing centrifugal clutches are avoided in the present invention in which a novel, fail-safe, centrifugal clutch and flexible coupling provides motion transmission between an input and an output shaft for all input shaft angular velocities equal to and greater than a predetermined threshold value. The unique structure of the present invention is such that assemblies with missing or improperly assembled parts will not transmit motion at any angular velocity, and assemblies with misaligned input and output shafts will still operate even at high rotational speeds without shaft bearing failure attributable to centrifugal loading.

SUMMARY OF THE INVENTION

Accordingly it is an object of the present invention to provide a new and improved centrifugal clutch for transmitting rotary motion at angular speeds above a predetermined threshold value.

Another object of the invention is to provide a new and improved speed-discriminating, centrifugal clutch which is fail safe.

Yet another object of the invention is to provide a new and improved and speed-discriminating, centrifugal clutch which will not transmit rotary motion if components are improperly assembled or missing.

Still another object of the invention is the provision of a new and improved speed-discriminating, centrifugal clutch which is operative with misaligned input and output shafts.

A further object of the invention is the provision of a new and improved speed-discriminating, centrifugal clutch which is operative at high rotational speeds with misaligned input and output shafts without shaft bearing failure.

These and other objects of the invention are attained by providing a speed-discriminating, centrifugal clutch having a biased, displaceable pawl element coupled to the input shaft, the pawl element having an engagement portion parallel to the input shaft. A ratchet element having a plurality of upstanding, circumferentially-spaced, planar engagement surfaces is secured to the output shaft. At angular speeds above a predetermined threshold value, the pawl element slides into driving engagement with the ratchet element, transmitting motion tangentially to the output shaft. For assemblies with missing or malassembled components, any rotational motion displaces the pawl to the fail-safe, non-driving position. The planar engagement surfaces of the ratchet element permit continued operation of the clutch for misaligned shafts.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein:

FIG. 1 shows an embodiment of the clutch of the present invention disengaged;

FIG. 2 shows the clutch engaged;

FIG. 3 shows the fail-safe position of the clutch;

FIGS. 4–6 are views along lines 4—4, 5—5, and 6—6, respectively, of FIGS. 1-3;

FIGS. 9a and 9b show an alternative embodiment of the invention in the disengaged and engaged positions, respectively;

FIG. 10 shows another alternative embodiment of the invention;

FIG. 11 is a view along line 11—11 of FIG. 10;

FIG. 12 is an exploded pictoral view of the embodiment of FIG. 10; and

FIG. 13 shows the relative positions of the pawl and ratchet in the embodiment of FIG. 10.

DESCRIPTION OF THE PREFERRED EMBODIMENT

Figure 7:
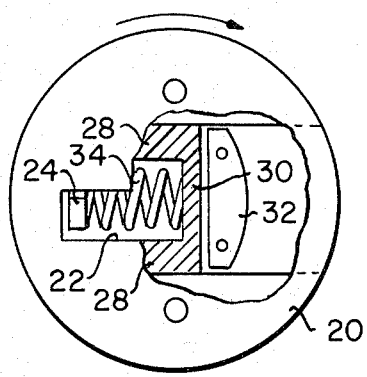
FIG. 7 is a view along line 7—7 of FIG. 1.

Referring now to the drawings wherein like reference characters designate identical or corresponding parts throughout the several views and more particularly to FIG. 1 thereof, centrifugal clutch 10 is shown to comprise the driving assembly 11 and the driven or ratchet assembly 40. The driving assembly 11 includes a housing 12 suitably attached to the driving or input shaft 14, as by a pin 16. Clutch housing 12, closed by a cover plate 20 (FIG. 7), is provided with an opening 18 in the lateral wall thereof to permit passage of the weight 32 therethrough (FIG. 3).

As shown in FIG. 7, the cover plate 20 is provided with a rectangular cutout 22 through which the tang or driving portion 24 of the pawl 26 extends, the tang 24 being substantially parallel to the axis of input shaft 14. Adjacent to and parallel with cutout 22 and extending into housing 12 are a pair of supporting rails 28, the ends of rails 28 approximate the center of housing 12 being joined by a backing piece 30. By way of example only, cover plate 20, rails 28 and backing piece 30 can conveniently be fabricated as a casting, with the cutout 22 integrally formed therewith.

Figure 8:
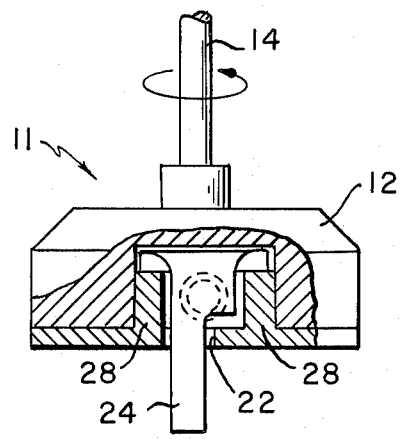
FIG. 8 is a view along line 8—8 of FIG. 2.

Slidably supported on the rails 28 is the pawl 26, having one end of reduced width bent to form an L-shape as viewed in FIGS. 1-3. The reduced-width end portion forms the tang 24 which extends through the cutout 22 and is substantially parallel to the driving shaft 14 to engage the ratchet assembly 40, as set forth more fully below. As clearly shown in FIGS. 7 and 8, the width of pawl 26 is sufficient to straddle and be supported by the rails 28. The end of the pawl 26 opposite tang 24 supports a weight 32 which displaces the center-of-gravity (c.g.) of the pawl such that during rotation centrifugal force tends to push the weight out through the opening 18 in the clutch housing.

Interposed between the tang 24 and the backing piece 30 is a coiled pawl spring 34 which urges the pawl to the left in FIGS. 1–2, or away from the opening 18. The spring constant of the pawl spring 34, together with the mass of pawl 26 and weight 32 are appropriately selected such that at rotational speeds below a predetermined value the spring force balances the centrifugal forces of the pawl and weight to maintain the clutch in the disengaged position of FIG. 1. At speeds above this predetermined value, centrifugal force acting through the displaced c.g. of the pawl-and-weight combination causes the pawl and weight to be rapidly displaced, or "snap", to the right of FIG. 2, compressing the spring and causing tang 24 to engage the ratchet assembly 40, transmit rotary motion to the ratchet wheel 44 and the driven or output shaft 42.

In the event of missing or malassembled parts, such as with the pawl spring 34 missing, any rotation of the fail-safe clutch 10 causes the pawl 26 to be displaced to the right, as in FIG. 3. However, since the engagement position is determined by the fully-compressed length of spring 34, then tang 24 is completely disengaged from the ratchet wheel. Thus no rotation is transmitted to the driven shaft 42 at any speed. All other parts of the clutch 10 are directly in the train of motion transmission; thus omission of such parts inherently prevents motion transmission. Malassembly of all parts except the pawl spring 34 is prevented by the configuration of the clutch. Pawl spring 34 can only be assembled in two improper locations: (1) between the housing 12 and the tang 24, to the left of backing piece 30 in FIG. 3; or (2) between piece 30 and the weight 32 in the same figure. Both of these improper locations lock the tang 24 in the unengaged position shown in FIG. 3.

Ratchet assembly 40 includes a ratchet 44 fixedly secured to the end of the driven shaft 42, both rotatable as a unit. The ratchet wheel 44 has a modified cruciform in plan form, with four unstanding engagement elements 46, each element having a planar surface for driving engagement by the tang 24 of pawl 26. The peripheral edges of the engagement elements are curved so that if the tang 24 encounters these edges, the prevailing forces naturally tend to cause the tang to slide into engagement with the planar surface 46 (FIGS. 4–6). The dimensions of the ratchet wheel 44, planar surfaces of the engagement element 46, and tang 24 are appropriately selected such that in the operative, engagement position of FIG. 2, with spring 34 fully compressed, tang 24 centrally engages the planar surfaces. In this engagement position, all transmitted forces are tangential to the driven shaft 42. There are no centrifugally - generated radial force components to impart loads to the shaft bearings, thus eliminating a major cause of bearing failure and clutch malfunction.

Another advantage of the present clutch design is the relationship between the tang 24 and the planar surfaces of the ratchet wheel which permits totally satisfactory functioning of the clutch and force transmission even though the driving shaft 14 and the driven shaft 42 are not perfectly coaxial. The foregoing unique features may be seen from the engaged position of FIGS. 2 and 5, wherein no centrifugal force generated by the pawl 26 is applied to the ratchet wheel 44 or output shaft 42. This feature, plus the radial contact between tang 24 and the planar surfaces of engagement elements 46, allows operation between misaligned shafts 14 and 42, even at high rotational speeds.

Figure 9A:
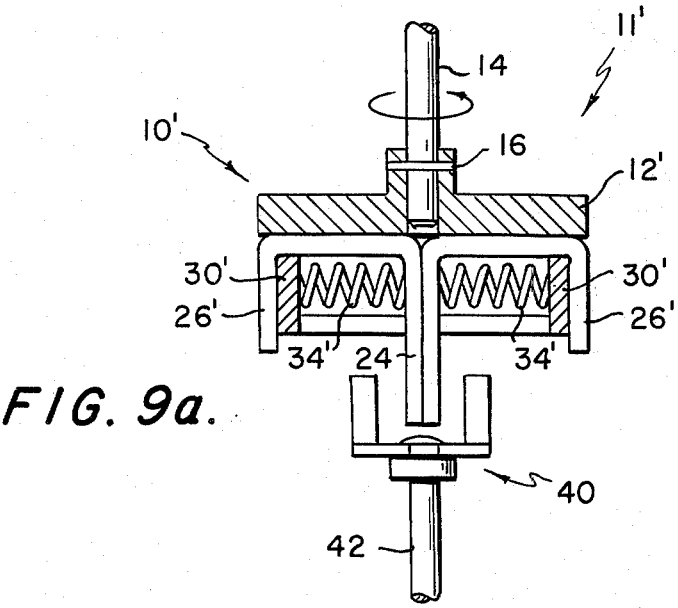

FIGS. 9a and 9b illustrate an alternative embodiment of the present clutch. Clutch 10' has the housing 12' suitably modified to receive a pair of pawls 26', each pawl resembling an inverted J and positioned back-to-back. Pawls 26' are slidably supported on rails similar to those described hereinabove, such as rails 28 of FIG. 8, and move radially outward to extent through diametrically located openings provided in the housing 12' (FIG. 9b). The rails are terminated at one end with backing pieces 30', and a pair of pawl spring 34' are positioned between the rails, one end of each spring abutting the backing pieces 30' and the other end of the springs pressing against the tangs 24' of pawl 26' to bias the pawls in the disengaged position of FIG. 9a. Under the proper centrifugal force, pawls 26' move radially outward, compressing springs 34' and engaging the ratchet assembly 40 the tangs 24', as shown in FIG. 9b. Shown in FIG. 9b by broken lines is the fail-safe position of the pawls 26' should the pawl springs 34' be omitted during assembly.

The operation of the described centrifugal clutch is evident from the foregoing. Under rotation by the driving shaft 14, clutch housing 12 and pawl 26 rotate as a unit. At rotational speeds below the threshold value, centrifugal force on the pawl is insufficient to overcome the spring force and the clutch is in the disengaged position of FIG. 1 or FIG. 9a. At or above the threshold value, the pawl 26 snaps over to the engaged position of FIG. 2, causing the tang 24 to drivingly engage with the planar surfaces of the engagement elements 46. In the event of a malassembly, such as the omission of the spring 34, any rotational speed displaces the driving pawl over to the far right position of FIG. 3, or the broken line position of FIG. 9b, with the tang 24 in the central, non-driving position relative to the ratchet wheel 44. Therefore no rotational movement is transmitted, a condition of a "safe failure."

FIGS. 10–13 illustrate another embodiment 10'' of the centrifugal clutch of the present invention. FIG. 10, a view similar to that of FIG. 7, shows the driving assembly 48 to include a pair of torsion springs 50 supported upon spring posts 52 attached to the housing 12''. A diametric rib 54 extends across the housing 12'' against which the pre-stressed spring 50 abuts when the centrifugal clutch 10'' is not rotating, or is rotating at speeds less than the threshold value. Rib 54 has curved end portions 55 which serve as stop means for the torsion springs 50 in the engagement position. Cover plate 20'' has a butterfly shape, with the wider portion covering the spring posts 52, and is attached to and supported by the posts. FIG. 12 shows the clutch housing assembly, or the driving assembly, 48 separated from the ratchet, or driven assembly 40, with the planar engagement surfaces 46 upstanding from the ratchet wheel 44. When clutch 10'' is rotating at or above the threshold speed, centrifugal force exceeds the preload force on springs 50 and causes the springs to be rotated into the engagement position shown by the broken lines in FIGS. 10 and 11, the angular outward displacement being controlled by the curvilinear extend of rib portion 55. FIG. 13, a plan view of the ratchet assembly 40, shows the relative positions of the torsion springs 50 and the planar engagement surfaces 46. The disengaged, non-driving position is shown by the similar, broken-line circle in the center of FIG. 13. In all other respects, clutch 10" operates in the same manner as the other embodiments previously considered. Omission of the torsion springs, of course, results in no transmission of rotary motion at any speed. Since the torsion springs 50 present dual engagement elements with the surfaces 46 (note FIGS. 5 and 13), this arrangement is ideally suited for high speed applications, as would the embodiment of FIGS. 9.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A fail-safe, velocity-discriminating centrifugal clutch comprising:
   a driving assembly coupled to a rotary input shaft;
   a biased means in said driving assembly displaceable from a non-motion-transmitting position to a motion-transmitting position at rotational speeds above a predetermined threshold value, said means having a motion-transmitting engagement portion extending from said assembly parallel to said input shaft;
   a driven assembly operatively positioned adjacent to said driving assembly and coupled to a rotary output shaft;
   a ratchet wheel secured to the output shaft; and
   a plurality of upstanding planar elements peripherally positioned on said ratchet wheel and oriented parallel to said rotary input and output shafts for driving contact by the motion-transmitting engagement portion of said biased means in the motion transmitting position of said means to transmit motion from the driving assembly to the driven assembly.

2. The centrifugal clutch of claim 1 wherein said biased means comprises:
   a slidable pawl element radially displaceable relative to the input shaft and having a motion-transmitting engagement tang extending parallel to said input shaft for engagement with said planar elements in the motion-transmitting position of said pawl element; and
   a pawl spring cooperating with said pawl element to bias said pawl element toward a first non-motion-transmitting position.

3. The centrifugal clutch of claim 2 wherein said pawl element is further displaceable to a second non-motion-transmitting position.

4. The centrifugal clutch of claim 3 wherein said second non-motion-transmitting position is defined by said tang being in the center of said plurality of peripherally positioned, upstanding planar elements.

5. The centrifugal clutch of claim 3 wherein said biased means further comprises:
   a second slidable pawl element radially displaceable relative to the input shaft and having a motion-transmitting engagement tang extending parallel to said input shaft for engagement with said planar elements in the motion-transmitting position of said second pawl element; and
   a second pawl spring cooperating with said second pawl element to bias said second pawl element into abutting position with said pawl element in a first non-motion-transmitting position.

6. The centrifugal clutch of claim 5 wherein said first non-motion-transmitting position is defined by the tangs of said pawl and said second pawl elements in abutting position approximate the center of said plurality of peripherally positioned, upstanding planar elements.

7. The centrifugal clutch of claim 6 wherein said second nonmotion-transmitting position is defined by the tangs of said pawl and said second pawl elements being positioned outwardly of said plurality of peripherally positioned, upstanding planar elements.

8. The centrifugal clutch of claim 1 wherein said biased means comprises a pair of prestressed torsion spring rotationally displaceable into a motion-transmitting position, each of said springs having a motion-transmitting engagement portion extending parallel to said input shaft for driving engagement with said planar elements.

* * * * *